(12) United States Patent  
Ouderkirk et al.

(10) Patent No.: US 8,035,774 B2
(45) Date of Patent: Oct. 11, 2011

(54) MULTIFUNCTIONAL THICK FILM REFLECTIVE POLARIZER FOR DISPLAYS

(75) Inventors: Andrew J. Ouderkirk, Woodbury, MN (US); Timothy J. Nevitt, Red Wing, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/911,448

(22) PCT Filed: Apr. 12, 2006

(86) PCT No.: PCT/US2006/013959
§ 371 (c)(1),
(2), (4) Date: Jun. 5, 2008

(87) PCT Pub. No.: WO2006/113380
PCT Pub. Date: Oct. 26, 2006

(65) Prior Publication Data
US 2009/0128737 A1    May 21, 2009

Related U.S. Application Data (60) Provisional application No. 60/672,964, filed on Apr. 18, 2005.

(51) Int. Cl.
*G02F 1/1335* (2006.01)
(52) U.S. Cl. ............................................. 349/96
(58) Field of Classification Search .................. None
See application file for complete search history.

(56) References Cited

U.S. PATENT DOCUMENTS

| 4,525,413 | A | 6/1985 | Rogers et al. |
|---|---|---|---|
| 5,122,905 | A | 6/1992 | Wheatley et al. |
| 5,486,949 | A | 1/1996 | Schrenk et al. |
| 5,808,798 | A | 9/1998 | Weber et al. |
| 5,872,653 | A | 2/1999 | Schrenk et al. |
| 5,882,774 | A | 3/1999 | Jonza et al. |
| 6,207,260 | B1 | 3/2001 | Wheatley et al. |
| 6,268,961 | B1 | 7/2001 | Nevitt et al. |
| 6,368,699 | B1 | 4/2002 | Gilbert et al. |
| 6,531,230 | B1 | 3/2003 | Weber et al. |
| 6,624,937 | B2 | 9/2003 | Kashima |
| 6,827,886 | B2 | 12/2004 | Neavin et al. |
| 6,916,440 | B2 | 7/2005 | Jackson et al. |
| 6,936,209 | B2 | 8/2005 | Jackson et al. |
| 6,939,499 | B2 | 9/2005 | Merrill et al. |
| 6,949,212 | B2 | 9/2005 | Merrill et al. |
| 2002/0180107 | A1 | 12/2002 | Jackson et al. |
| 2002/0190406 | A1 | 12/2002 | Merrill et al. |
| 2004/0099992 | A1 | 5/2004 | Merrill et al. |
| 2004/0099993 | A1 | 5/2004 | Jackson et al. |

FOREIGN PATENT DOCUMENTS

EP     0404463     6/1996

*Primary Examiner* — Tina Wong
(74) *Attorney, Agent, or Firm* — Jay R. Pralle (57) ABSTRACT

Multilayer reflective polarizers are disclosed that utilize a thick film multilayer stack and that are suitable for use in liquid crystal display devices. The disclosed polarizers can be mechanically stiff and suitable for use as a plate or substrate for other light control films within the display. The polarizers can also include diffusing means to scatter transmitted light of the pass state, reflected light of the block state, or both.

23 Claims, 6 Drawing Sheets

MULTIFUNCTIONAL THICK FILM REFLECTIVE POLARIZER FOR DISPLAYS

CROSS-REFERENCE

This application claims the benefit of U.S. Provisional Application No. 60/672,964, filed Apr. 18, 2005, which is incorporated by reference herein.

FIELD OF THE INVENTION

The present invention relates to optical bodies such as polarizers, diffusers, reflectors, and the like, particularly those used in visible light applications such as liquid crystal display (LCD) devices and other electronic display devices, as well as to methods of making and using such optical bodies, and display devices incorporating same.

BACKGROUND

Recent years have seen tremendous growth in the number and variety of display devices available to the public. Computers (whether desktop, laptop, or notebook), personal digital assistants (PDAs), mobile phones, and thin LCD TVs are but a few examples. Although some of these devices can use ordinary ambient light to view the display, most include a backlight to make the display visible.

Many such backlights fall into the categories of "edge-lit" or "direct-lit". These categories differ in the placement of the light sources relative to the output face of the backlight, which output face defines the viewable area of the display device. In edge-lit backlights, a light source is disposed along an outer border of the backlight construction, outside the area or zone corresponding to the output face. The light source typically emits light into a light guide, which has length and width dimensions on the order of the output face and from which light is extracted to illuminate the output face. In direct-lit backlights, an array of light sources is disposed directly behind the output face, and a diffuser is placed in front of the light sources to provide a more uniform light output. Some direct-lit backlights also incorporate an edge-mounted light, and are thus capable of both direct-lit and edge-lit operation.

It is known to use an array of cold cathode fluorescent lamps (CCFLs) as the light sources for direct-lit backlights. It is also known for the diffuser to be in the form of a stiff sheet or plate that is mounted in a frame at a fixed position from the light sources. The mechanical stiffness of the plate helps keep the diffuser at a nominally fixed position relative to the light sources across the surface of the output face under normal handling conditions, using only edge mounting around the periphery of the diffuser. The diffuser also functions as a stable substrate against which additional light management films can be placed. Such additional films are often thin and flexible relative to the stiff diffuser plate, and can include in some cases an additional thin diffusing film, a prismatic brightness enhancement film such as Vikuiti™ brand Brightness Enhancement Film (BEF) available from 3M Company, and a reflective polarizing film such as Vikuiti™ brand Dual Brightness Enhancement Film (DBEF) available from 3M Company.

Thin film multilayer reflective polarizers can be made by an extrusion process in which a multitude of alternating light-transmissive polymer materials are coextruded through a die, optionally passed through one or more layer multipliers, then cast onto a casting wheel or surface, and subsequently stretched to form a refractive index mismatch $\Delta n_x$ between adjacent layers along an in-plane x-direction and a refractive index match ($\Delta n_y=0$) along an orthogonal in-plane y-direction. See, for example, U.S. Pat. Nos. 5,486,949 (Schrenk et al.); 5,882,774 (Jonza et al.); 6,531,230 (Weber et al.); and 6,827,886 (Neavin et al.). Such all-polymer thin film multilayer reflective polarizers do not require a separate substrate for formation or handling, but are often sold in the form of thin flexible films or sheets.

In general, the physical size of optical components such as diffuser plates and polarizers used in liquid crystal displays should substantially match the size of the output screen. As the demand for larger screen sizes grows, so too does the requirement for physically larger samples of such optical components, including reflective polarizers. However, most reflective polarizers used in displays are thin film multilayer devices that rely on coherent constructive or destructive interference of light from neighboring layer interfaces. Such constructive or destructive interference is a strong function of the individual layer thicknesses, as well as other geometric factors. Great care is typically needed to ensure that the layers are controlled to within a narrow tolerance to ensure proper operation of the reflective polarizer. Even greater care is necessary as the physical size of these polarizers increases. Increasing the physical size of thin film reflective polarizers also magnifies potential mechanical problems such as wrinkling, warping, and delamination.

BRIEF SUMMARY

The present application discloses, inter alia, thick film reflective polarizers that can combine various mechanical and/or optical functions previously provided by multiple distinct components. Such reflective polarizers can be used beneficially in the fabrication of liquid crystal displays and the like that are simpler in design, easier to construct, and less susceptible to certain failure modes such as film warping, buckling, or delamination relative to existing displays and display components.

One such reflective polarizer is configured as a rigid plate and includes a stack of optically thick polymer material layers. These layers contribute substantially to the reflectivity of the polarizer. The polarizer plate can also function as a diffuser plate. Preferably, at least one of the polymer materials is birefringent so that adjacent layers have a substantial refractive index mismatch $\Delta n_x$ along one in-plane axis and a refractive index mismatch $\Delta n_y$ along an orthogonal in-plane axis that is zero or small relative to $\Delta n_x$. The zero or small index mismatch along the y-axis defines a "pass" polarization state and the index mismatch along the x-axis defines a "block" polarization state. Depending on the method of fabrication, adjacent layers may have a refractive index mismatch $\Delta n_z$ along an out-of-plane z-axis that is zero, or small in magnitude relative to $\Delta n_x$, or comparable in magnitude to $\Delta n_x$. The individual alternating polymer layers are not only optically thick but also preferably sufficiently physically thick to provide the optical body with mechanical stiffness adequate to prevent sagging, warping, or buckling over the viewable area of the display when the optical body is edge-mounted in the display. Preferably, the individual polymer layers have an average optical thickness of at least about $(5/4)\lambda_0$, where $\lambda_0$ is a design wavelength, e.g. 550 nm as an average or representative of the visible light spectrum. In certain embodiments the average optical thickness is from about $(5/4)\lambda_0$ to $5\lambda_0$ or $10\lambda_0$, and the overall physical thickness of the reflective polarizer is from about 1 to 10 millimeters, more preferably from about 1 to 5 or even 2 to 4 mm.

In some cases the optical body is made by coextruding tens or hundreds of alternating polymer layers to form a thick film multilayer extrudate, which is then cast and oriented using a uniaxial stretching device. In exemplary embodiments, the stretching device performs an unconstrained uniaxial stretch, e.g. by use of a parabolic tenter operating on a continuous web of extrudate. The optical body can also be made by laminating together a plurality of separate layer components, at least some of the layer components being stretched polymer films or sheets, whether single layer or multilayer films or sheets.

The optical body also preferably includes diffusing means that can be tailored to diffusely reflect the block polarization state, and/or diffusely transmit the pass polarization state.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION OF THE ILLUSTRATIVE EMBODIMENTS

Figure 1:
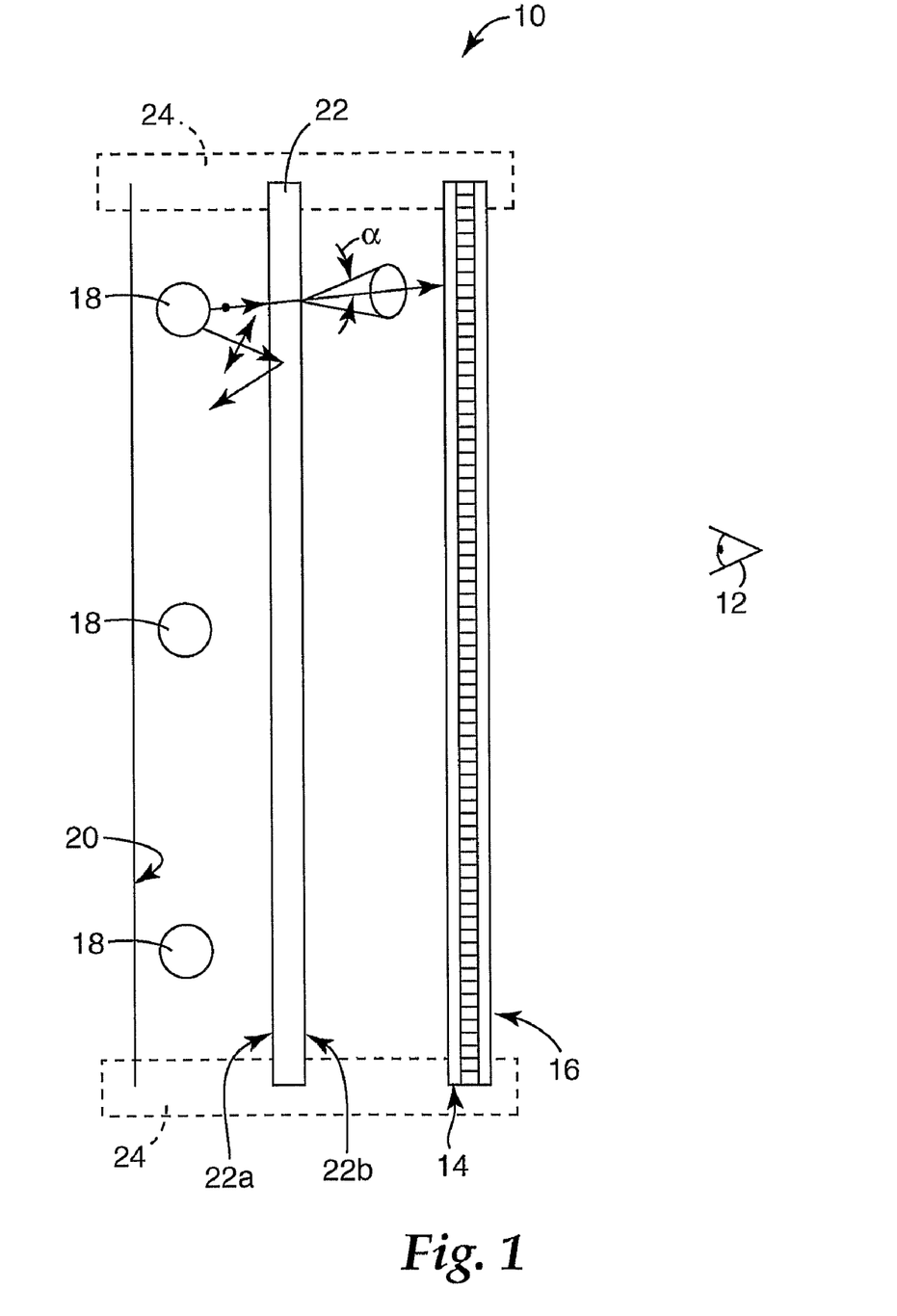
FIG. 1 is a schematic cross-sectional view of selected components of a direct-lit liquid crystal display (LCD) television or similar display device.

In FIG. 1, we see in schematic sectional view of selected components of a direct-lit liquid crystal display (LCD) device 10. Device 10 may be a television, computer monitor, or any other device that displays a programmable image to a viewer 12. In device 10, the image is provided by a pixilated liquid crystal (LC) panel 14. The LC panel 14 includes an electronically addressable liquid crystal array sandwiched between glass plates. The lateral dimensions of the LC panel 14 define a viewable front surface or area 16, even though other optical components such as an absorbing polarizer, a protective layer, or the like may be present between the LC panel and the viewer.

The device 10 also includes light sources 18 that illuminate the LC panel from behind to make the image visible to the viewer in front. The sources 18 can be cold cathode fluorescent lamps (CCFLs), or any other suitable source or combination of sources capable of providing a sufficient amount of white light to adequately illuminate the display. For example, the sources can also be white light emitting light emitting diodes (LEDs), or an array of colored (e.g., red/green/blue) LEDs. The sources are positioned in front of a specular or diffusely reflective back reflector 20, which helps direct light that would otherwise be lost or wasted towards the LC panel 14.

FIG. 1 also depicts a thick film reflective polarizer plate 22 disposed in front of the light sources 18 and behind the LC panel 14. "Plate" in this regard refers to an extended body whose composition and dimensions such as thickness and width are such as to permit the body to substantially maintain its shape and substantially resist sagging, bending, flexing, and the like when the body is held at its edge and subjected to gravitational and/or normal handling forces in the intended application. In fact, the reflective polarizer plate 22 is depicted in FIG. 1 as being edge-mounted in a frame 24 that surrounds the optical components and the viewable front surface 16. The light sources 18 are also preferably mounted in a substantially fixed position relative to the frame 24, whether by direct or indirect connection thereto.

Polarizer plate 22 and other polarizer plates disclosed herein are depicted schematically in the figures as a substantially flat, extended optical body. The reader will understand, however, that these plates need not always be planar and flat, but can also be molded or otherwise formed into a curved, angled, or otherwise non-flat body. The plates may be curved in one plane (simple curvature) or in two orthogonal planes (complex curvature), or can have any other desired non-planar shape.

As shown in the figure, the reflective polarizer plate 22 substantially transmits one polarization state, referred to as the pass state, and substantially reflects an orthogonal polarization state, referred to as the block state. The figure shows the pass state being transmitted diffusely into a cone of half-angle α, and the block state being reflected specularly. However, depending on design details discussed further below, either or both of the transmission and reflection may be specular, and either or both may be diffuse. If both are diffuse, one may be more diffuse than the other, i.e., the half-angle of diffusivity may be different for the reflected versus the transmitted light. In a direct-lit display system it can be beneficial for the polarizer plate to transmit the pass state polarization diffusely, to help hide bright spots associated with the nearby light sources and make the display more uniform in brightness over the front surface 16. The diffusion cone half-angle α can be measured from a direction of maximum intensity $I_0$, often corresponding to the specular direction, to a direction at which the intensity drops to half, $I_0/2$. The diffusion may also be asymmetric, for example, elliptical, where light is diffused more highly along one transverse axis than along another (e.g. orthogonal) transverse axis.

One benefit of using a polarizer that reflects rather than absorbs the blocked state is the efficiency improvement possible where the polarizer is combined with another reflector to form a light recycling cavity, preferably with one or more polarization converting elements. For example, if the back reflector 20 is diffusely reflective it can scramble an incident beam of one polarization into a reflected beam of two polarization states, one of which corresponds to the pass state of polarizer plate 22. Another example of a polarization converter is a retarding film such as a single quarter wave film or layer. By using such a polarization-converting element, at least some of the light initially rejected by the polarizer because it was in the block polarization state can be ultimately transmitted by it, increasing net brightness. The display 10 can also include an absorbing polarizer (not shown) between the reflecting polarizer and the LC panel 14, where the pass axis of the reflective polarizer plate 22 is aligned with the pass axis of such an absorbing polarizer.

Figure 2A:
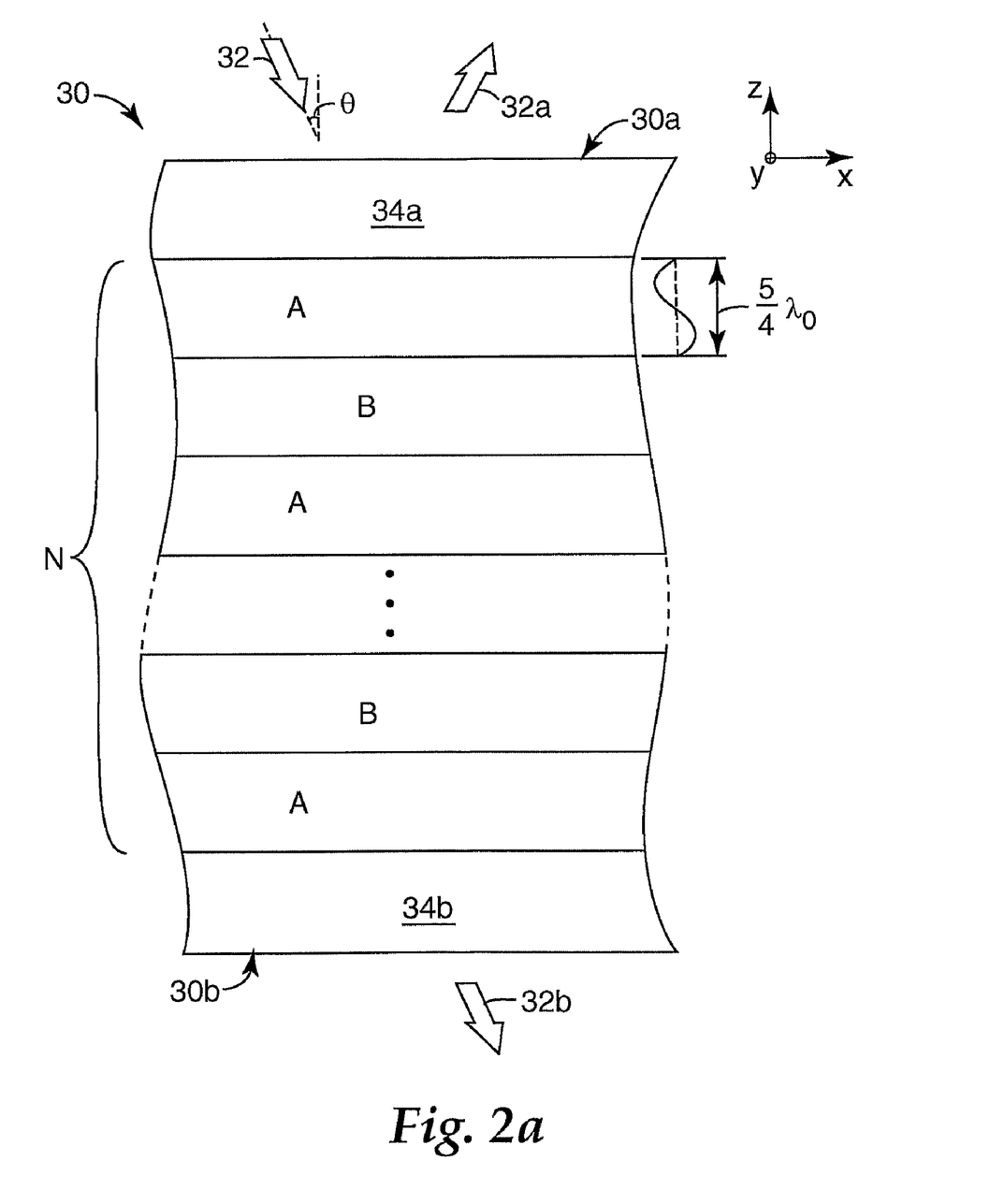
FIGS. 2a-d are schematic cross-sectional views of various thick film multilayer polarizer plates.

A portion of a thick film reflective polarizer plate 30 having first and second major surfaces 30a, 30b is shown schematically in FIG. 2a, where an unpolarized light beam 32 incident on the polarizing plate at an angle θ is reflected as a reflected beam 32a (block polarization state) and transmitted as a transmitted beam 32b (pass polarization state). The figure, which depicts layer thickness as an optical thickness rather than a physical thickness, and which also includes a Cartesian x-y-z coordinate system with the layers extending parallel to the x-y plane, and the z-axis corresponding to a thickness axis of the polarizer, shows a central group of N layers bounded by outer layers 34a, 34b (collectively, 34) for a total of N+2 layers. In some cases the outer layers 34 may be distinguishable in some way from the central N layers. For example, the central N layers may consist essentially of two alternating coextruded light-transmissive polymer materials A,B, and the outer layers may both be made of a different light-transmissive polymer material selected for its optical, mechanical, or chemical properties. See e.g. U.S. Pat. No. 6,368,699 (Gilbert et al.). The outer layers 34 may, for instance, provide scratch resistance via a hard coating composition, UV protection via ultraviolet absorbers or inhibitors in a matrix material, antistatic properties, slip properties via slip agents, appearance-modifying properties via diffusing agents, colorants, dyes, pigments, and the like, and/or warp resistance. The outer layers 34 may also have thicknesses substantially different from that of the central N layers, whether substantially thinner or substantially thicker. Alternatively, the outer layers 34 may be indistinguishable from the central N layers, in which case they are simply the endpoints of a pattern established by the other layers. One or both of outer layers 34 may also be omitted. Although the reflective polarizer plate 20 can be composed of as many light transmissive materials as the number of constituent layers in the reflector (e.g. N, N+1, or N+2), with no two layers having the same composition, it is usually more practical to arrange two, three, or another small number of light-transmissive materials in an alternating fashion such as . . . ABAB . . . or . . . ABCABC . . . or the like.

Optically thick film multilayer reflectors differ from their thin film counterparts in that the individual layers are so thick that a first and second light component reflecting from adjacent interfaces in the optical body presumably combine substantially incoherently from the standpoint of the wavelength of interest. One example is the "pile-of-plates" polarizer. Where the wavelength of interest is human-visible light, for example, this means that, for a visible light ray or beam that impinges upon two adjacent interfaces to produce two corresponding reflected and transmitted light components, an observer viewing the resulting reflected or transmitted light will notice no change in brightness or color (spectral distribution) of the observed light if the layer thickness is varied a small amount. See also, for example, U.S. Pat. No. 5,122,905 (Wheatley et al.), which states in connection with an optically thick multilayer reflector that "the individual layers should have an optical thickness such that no visibly perceived iridescence is reflected from the body". The '905 Wheatley reference describes thick layers as those whose optical thickness is at least 0.45 micrometers. As another example, U.S. Pat. No. 5,808,798 (Weber et al.) describes a "pile of plates" or "thick film" stack of alternating layers of materials A and B in which the average optical thickness of the layers in the stack is at least 5/4 times the average wavelength of the light to be reflected.

Each layer has refractive indices for light polarized along the x-, y-, and z-axis of $n_x$, $n_y$, and $n_z$ respectively. Differences in refractive index between adjacent layers along these axes, which differences may in general be zero or nonzero, are $\Delta n_x$, $\Delta n_y$, and $\Delta n_z$, respectively. For a reflective polarizer, $\Delta n_y$ is zero or has a magnitude small relative to that of $\Delta n_x$, where one can use the arbitrary convention of assigning the x-axis to the direction of maximum in-plane refractive index difference. In that case the x-axis corresponds to the block axis of the polarizer and the y-axis corresponds to the pass axis. In polymeric constructions it is often convenient to make the polarizer with "A" layers that develop stress-induced birefringence during stretching and "B" layers that remain isotropic. This is not, however, a requirement, since it is also possible for both layer types to develop stress-induced birefringence, as long as one in-plane refractive index difference ($\Delta n_x$) between adjacent layers is substantially greater than another in-plane index difference ($\Delta n_y$).

In FIG. 2a, the individual layers are shown as having optical thicknesses somewhat greater than the thickness of the design wavelength $\lambda_0$, for example, $(5/4)\lambda_0$ or more, and at any rate of a thickness that would be considered optically thick by the person of ordinary skill in the art. At least some of the layer thicknesses can also be on the order of $\lambda_0$ or even less, and some, most, or substantially all can be greater than $(5/4)\lambda_0$, or greater than $2\lambda_0$, $5\lambda_0$, or $10\lambda_0$ or more, with no strict upper limit. In some cases it may also be desirable to combine one or more thick film stack with one or more thin film stack (such as a quarter-wave interference stack) to make a hybrid multilayer reflective polarizer. Thick film multilayer reflective polarizers can also be described as those having a number N of individual layers whose optical thicknesses, or the average thereof, are at least $(5/4)\lambda_0$, and N is large enough such that these optically thick layers contribute substantially to the reflectivity and/or transmission of the polarizer. For example, the number N may be large enough that the optically thick layers are responsible for at least half of the reflectivity at the design wavelength $\lambda_0$, or even for substantially all of the reflectivity at the design wavelength.

An optical thickness range of interest is from about $(5/4)\lambda_0$ to about $5\lambda_0$ or $10\lambda_0$, where for operation over the entire visible spectrum the design wavelength $\lambda_0$ can be taken to be approximately in the middle of the visible region (about 550 nanometers) or can be taken as a long wavelength end of the visible region (approximately 700 nm). Thick film layers whose optical thickness is in this range are referred to herein as being moderately thick. Such moderately thick film multilayer reflectors can benefit in a particular way from having certain non-uniform distributions of layer optical thickness as described in commonly assigned and co-pending U.S. application Ser. No. 11/109,212 entitled "Multilayer Reflector With Randomized Layer Thickness Profile", filed Apr. 18, 2005. For example, by tailoring the layer optical thicknesses to produce a graded or randomized layer distribution, a moderately thick film multilayer reflector can exhibit increased average reflectivity and decreased variability in reflectivity over the visible region.

The disclosed reflective polarizers are capable of reflecting a substantial amount of light of one polarization over substantially the entire visible spectrum. For example, the disclosed reflectors desirably have a normal incidence average reflectivity for the block polarization state from about 400-700 nm of at least about 30%, 40%, or even 45%. This can be accomplished by controlling the refractive index relationships of the individual light-transmissive layers to achieve sufficiently high refractive index differences between layers, in combination with ensuring a sufficient number N of such layers in the stack. However, the refractive index relationships are also preferably controlled to ensure a sufficiently small refractive index difference in an orthogonal direction so that the pass state light is substantially transmitted, not substantially reflected, over the visible spectrum.

In a process of designing a thick film multilayer reflective polarizer, the individual layer thicknesses may be determined or calculated by first specifying a desired overall thickness of the finished reflective polarizer and a desired reflectivity or transmissivity of the polarizer, provided the specific light-transmissive polymer materials have predictable refractive index characteristics. Where the polarizer plate is made by a process that includes uniaxially stretching a single- or multi-layer cast polymer web, for example, then details of the stretching process and knowledge of the polymer material properties will inform the designer what layer-to-layer refractive index differences can be expected under those processing conditions. With the refractive index information, the number of layers N needed to provide a desired reflectivity of the blocked state, for example, can then be estimated. Then, if the polarizer has a target overall physical thickness D, for example in the range from 1 to 10 mm or even from 1 to 4 mm so as to achieve relative mechanical stiffness but in a relatively low profile plate, then the nominal physical thickness of the individual layers can be estimated at D/N.

The thick film reflective polarizer plate 30 can be designed to exhibit a controlled amount of scattering or diffusion for reflected and/or transmitted light. This added functionality can help reduce or eliminate the need for diffusing elements elsewhere in a display system. An advantage of adding diffusing means to a thick film reflective polarizer compared to a thin film reflective polarizer is that a longer optical path through the polarizer is available, so the diffusing means—whether they comprise particles, surface roughness features, and/or other disclosed structures—can be distributed less densely than would otherwise be required. Another advantage is that to the extent the diffusing means disturbs the optical thickness or uniformity of the individual layers, such disturbances will have less of a negative impact on the reflective properties of a thick film multilayer reflector compared to those of a thin film multilayer reflector due to the latter device's relatively high sensitivity to layer thickness.

Figure 2B:
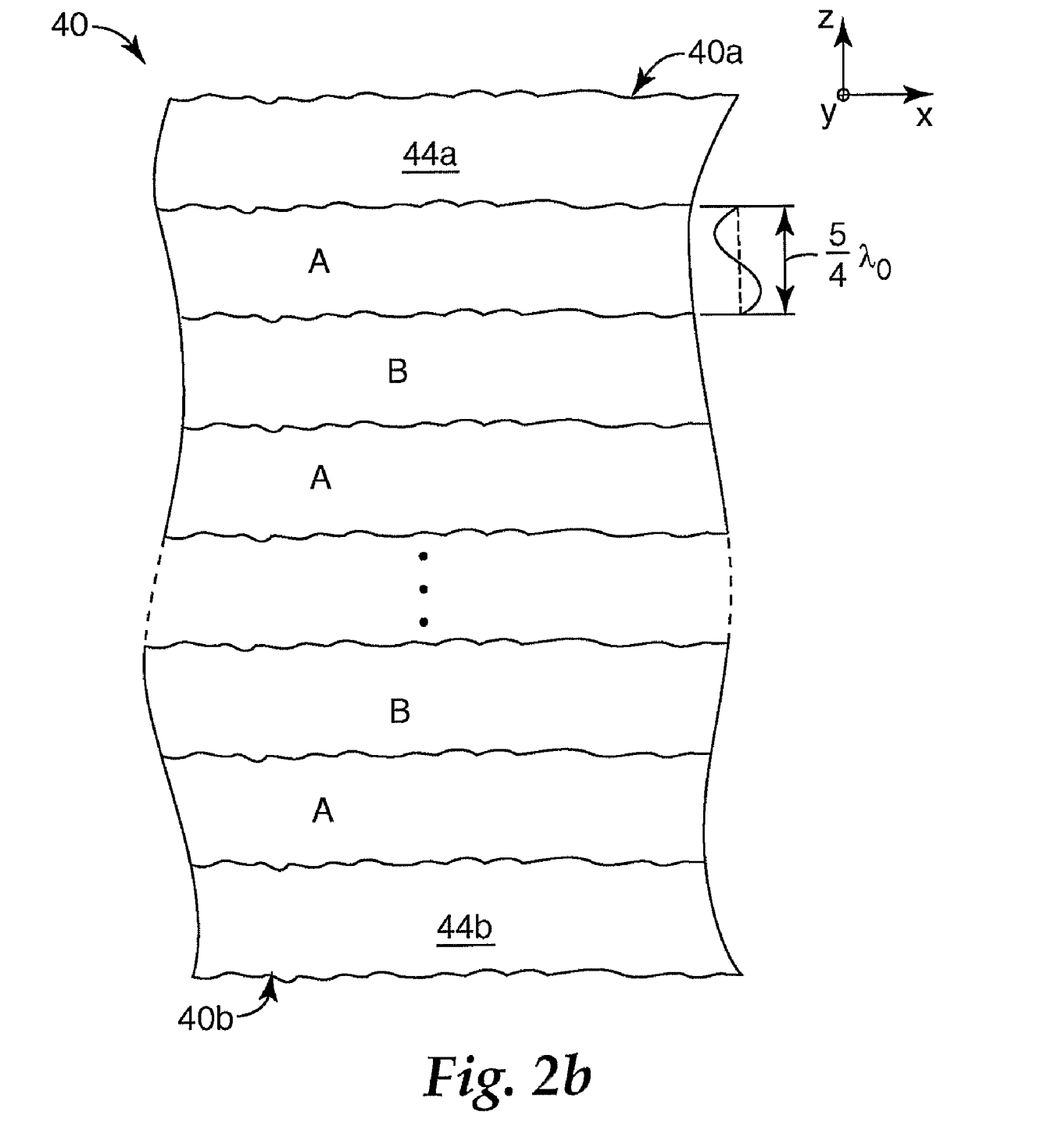

Turning now to FIG. 2b, we see there a thick film multilayer reflective polarizer 40 having first and second major surfaces 40a, 40b. The polarizer has a central group of N thick light-transmissive layers, for example, of an alternating AB arrangement, bounded by optional outer layers 44a, 44b (collectively, 44). Other features of polarizer 40 are analogous to polarizer 30 of FIG. 2a. However, polarizer 40 is provided with individual layer surfaces that are substantially roughened to promote scattering of light. In the figure, substantially all of the individual layer surfaces, including the two outermost surfaces 40a, 40b in contact with air, and all the remaining (interior) surfaces at polymer/polymer interfaces, are shown to be roughened. For reflective polarizers made by polymer multilayer coextrusion, interior surface roughening can be achieved by controlling the coextrusion process to generate flow instabilities, producing non-smooth layer interfaces. One or both outer surfaces can be roughened by microembossing, or by quenching the molten multilayer extrudate against a casting wheel or surface that is microtextured. If a lamination procedure is used in the construction of the thick film multilayer polarizer, interior surface roughening can be achieved by roughening any or all outer surfaces of individual sheets or layers to be laminated (which individual sheets or layers may themselves consist essentially of only a single layer or may comprise a multilayer coextruded and oriented stack of layers), followed by laminating the individual sheets or layers. Other techniques include incorporating materials in one or more layers that will cause roughening of the interfacial surfaces. Suitable materials include inorganic particles or fibers, immiscible polymer dispersions, liquid crystals, phase separating liquids, and polymer particles. Suitable polymer particles include cross-linked microspheres and thermoset or thermoplastic polymer fibers. It is also possible to roughen only some of the surfaces, for example, only interior surfaces, or only selected interior surfaces. This can be done by using different polymer flows to produce the different layers within the coextrusion. For example, an ABA'B layer stack may be produced where B is one polymer, A is a second polymer, and A' is the second polymer containing a material or having a different rheology, or both that results in the BA'B interfaces being roughened after orientation. The surface roughening can be provided to surfaces within the thick film stack symmetrically or asymmetrically along the thickness or z-axis. If provided asymmetrically, e.g., providing more surface roughening to interior surfaces proximate outer layer 44a than to interior surfaces proximate outer layer 44b, then the film's reflective and transmissive properties can differ depending on which side of the reflective polarizer the incident light impinges upon.

Recalling that pass state polarized light experiences little or no refractive index difference between adjacent layers, any roughened interior surfaces will have no effect or at least a substantially reduced effect on such light compared to block state polarized light, which experiences a maximum or large refractive index difference between layers. Therefore, the use of interior surface roughening as a diffusing means can produce significantly larger amounts of scattering, and larger values of half-angle α, for reflected light of the block state compared to transmitted light of the pass state. This is unlike scattering due to exterior surface roughening, which affects the block state and pass state more equally because of the large polymer/air refractive index difference for each. Surface roughening also allows the range of scattered angles to be better controlled than some particulate-based diffusers, and more easily allows the formation of elliptical diffusers. Roughened surfaces may be formed with smooth features, such as sinusoidal structures or bumps, or structures with sharp edges, including prisms. The size of the structures may range from about 0.5 microns to about 1000 microns, and may have a regular or random pitch. The suitable height of the features will depend on the feature base width, but in general will be between about 10 and about 100% of the base dimension.

Figure 2C:
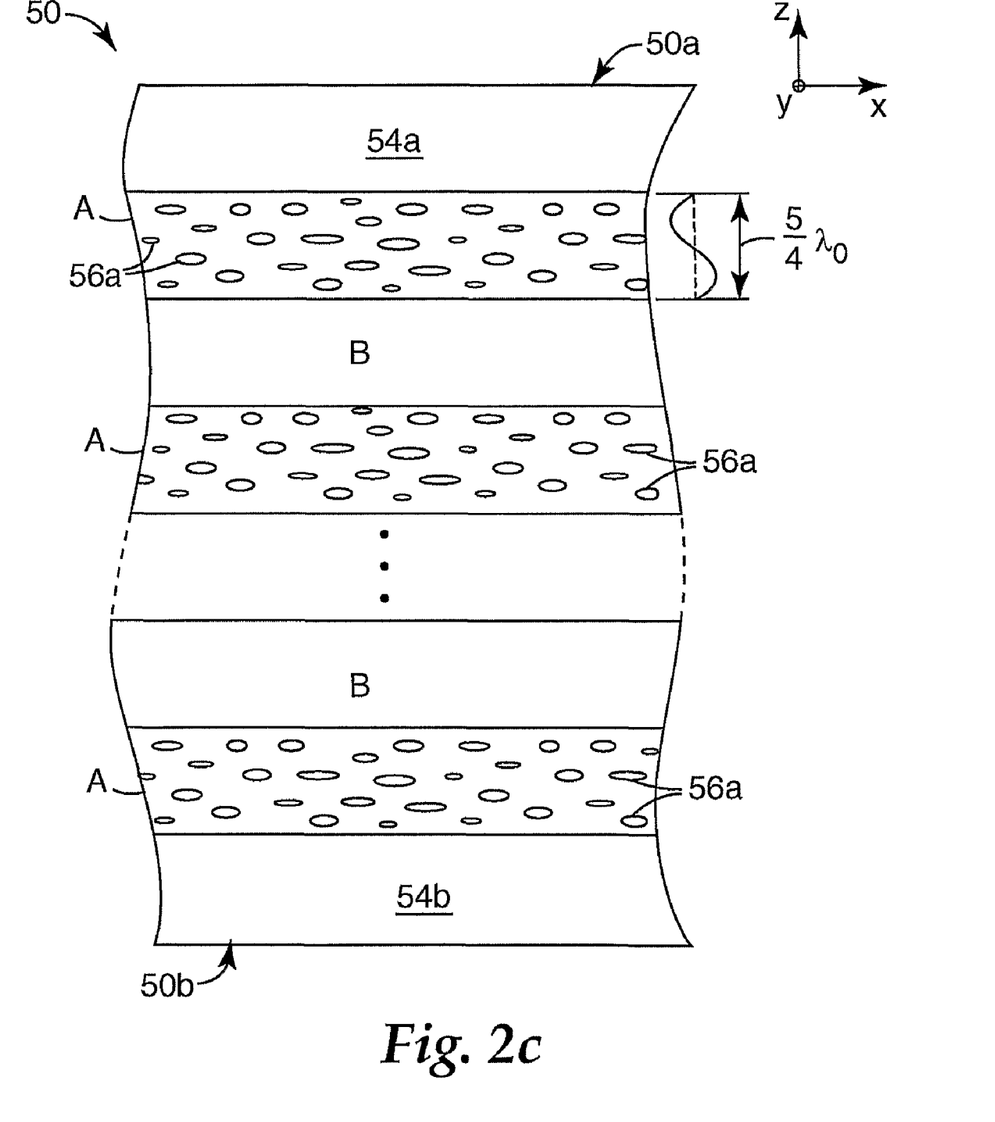

In FIG. 2c, we see another thick film multilayer reflective polarizer 50, which is also similar to polarizer 30. Polarizer 50 has first and second major surfaces 50a, 50b, and a central group of N thick light-transmissive layers, for example, of an alternating AB arrangement, bounded by optional outer layers 54a, 54b (collectively, 54). Like polarizer 40, polarizer 50 includes diffusing means to provide light scattering. But in polarizer 50, the diffusing means comprises particles 56a distributed throughout at least some of the alternating interior layers A, B. In the figure, they are distributed throughout only the A layers. Preferably, the particles 56a are composed of a light-transmissive material, but they have a different refractive index along at least one in-plane direction x,y relative to the material in which they are embedded. By appropriate selection of materials and processing conditions, a variety of different diffusing properties can be produced.

For example, if the A layers in which the particles 56a are embedded are isotropic in refractive index ($n_x=n_y=n_z$), and if the particles 56a are also isotropic but differ in refractive index from the continuous phase material of the A layers, then the modified A layers will scatter light nominally equally for the block state and the pass state.

Alternatively, the A layers may again be isotropic but the particles 56a may be birefringent. In one such case, the birefringence of the particles 56a may be the same as or similar to that of the birefringent B layers, so that a maximum refractive index difference between the particles 56a and the continuous phase material of the A layers occurs along the x-axis, and a minimum or zero difference occurs along the y-axis. In that case the diffusing particles 56a may minimally scatter the transmitted pass state but significantly scatter the reflected block state. In another case, the birefringence of the particles 56a may be orthogonally disposed relative to the birefringent B layers, so that a maximum refractive index difference between particles 56a and the continuous phase material of the A layers occurs along the y-axis, and a minimum or zero difference occurs along the x-axis. In this case the particles can substantially scatter the transmitted pass state polarization while having little or no scattering effect on the block state reflected light.

In another alternative, the A layers may be birefringent but the particles 56a may be isotropic.

Figure 2D:
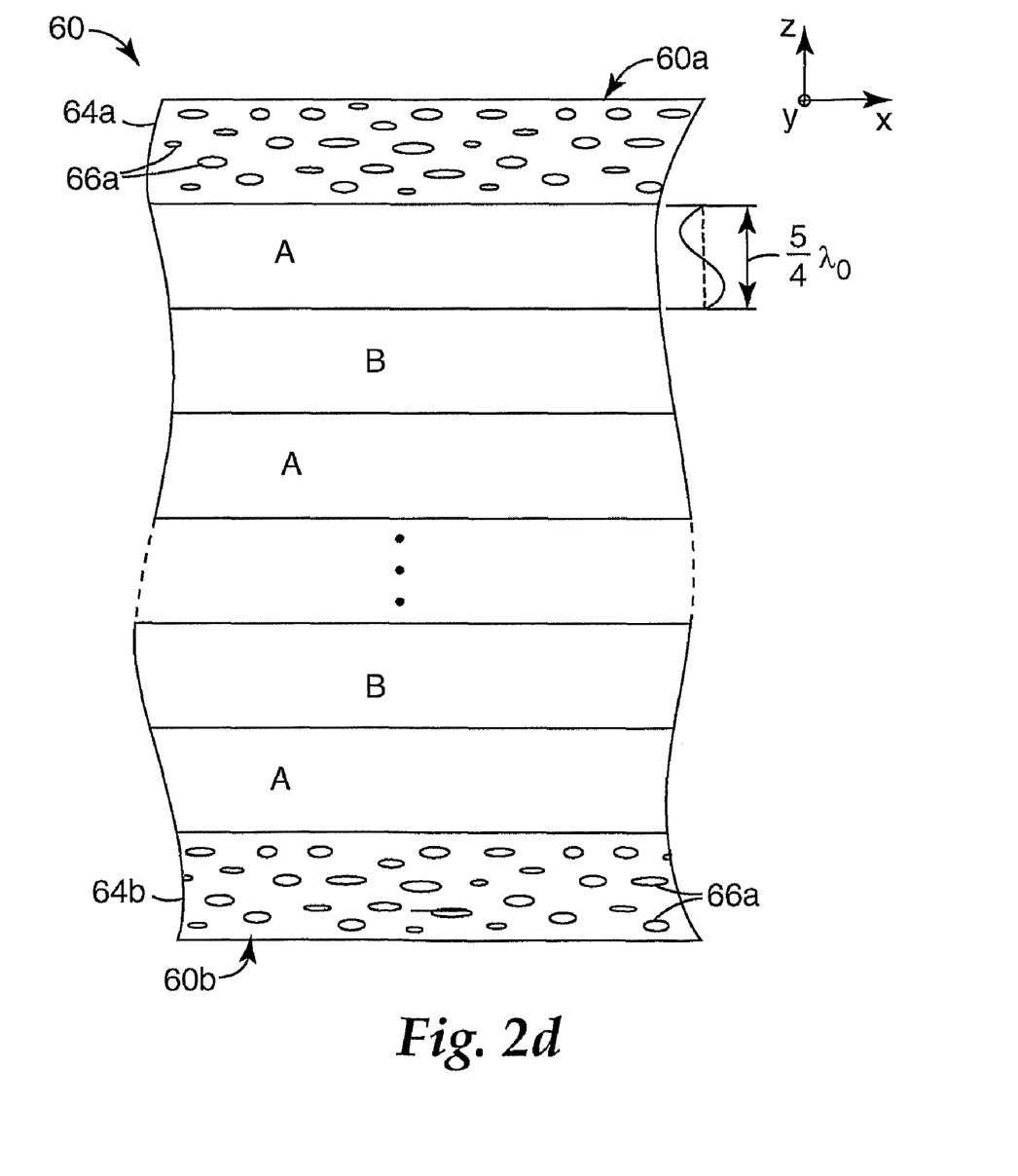

In polarizers designed for high pass polarization axis transmission, it is preferred that the index difference between the particles and the matrix polymer be less than about 0.1. Polarizers where it is acceptable or preferred to have lower pass polarization transmission may be designed with a larger index difference. The index difference between the particle and the matrix in the block polarization axis can be smaller than for the transmission polarization axis. This may be desirable to reduce scatter-induced absorption. Alternatively, the index difference in the block polarization axis may be greater that the pass axis so as to increase the polarizer's polarization efficiency. The diffusing particles may be formed by blending two immiscible polymers, or by blending polymers that are miscible in the melt state, but phase separate when solidified or oriented. The particles may be a discrete phase, may be a continuous phase, and may be co-continuous with the other polymer in which the particles are embedded. The effective particle size as determined by light scattering should be between about 0.1 microns and 10 microns in at least one axis parallel or perpendicular to the film orientation direction. The shape of the particle may be spherical, ellipsoidal, fibular, irregular, or a combination thereof. Asymmetric particles may also have a preferred orientation direction. The scattering component may make up between about 0.01% to about 50 wt % of at least one polymer layer. In FIG. 2d, we see another thick film multilayer reflective polarizer 60, which is again similar to polarizer 30. Polarizer 60 has first and second major surfaces 60a, 60b, and a central group of N thick light-transmissive layers, for example, of an alternating AB arrangement, bounded by optional outer layers 64a, 64b (collectively, 64). Like polarizer 50, polarizer 60 includes diffusing means to provide light scattering. And also like polarizer 50, the diffusing means includes particles 66a that are similar to particles 56a. But in polarizer 60, the diffusing particles 66a are distributed in at least one of the outer layers. Again depending on whether or to what extent the particles 66a are birefringent, and whether or to what extent the continuous phase material of layers 64a, 64b are birefringent, combinations can be selected as described above in which the reflected block state polarization is predominately scattered, or the transmitted pass state polarization is predominantly scattered, or both polarization states are scattered roughly equally.

In some embodiments, some or all of the particles 56a or 66a can be replaced with voids or bubbles of suitable size, shape, and distribution. Such bubbles can be introduced in a variety of known ways. In one technique, small seed particles are dispersed in the layer(s) of interest, and the layer(s) are then oriented to create the voids where the seed particles are located.

DISCUSSION

The ability to achieve desired relationships among the various indices of refraction (and thus the optical properties of the multilayer reflector device) is influenced by the processing conditions used to prepare the multilayer device. In the case of organic polymers that can be oriented by stretching, the devices can be generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is generally stretched substantially in one direction (uniaxial orientation, whether constrained or unconstrained), while in the case of mirrors the film is generally stretched substantially in two directions (biaxial orientation). See, for example, U.S. Pat. No. 5,882,774 (Jonza et al.), U.S. Pat. No. 6,827,886 (Neavin et al.), and U.S. Pat. No. 6,949,212 (Merrill et al.). In either case, the stretching can be done on a continuous manufacturing line, e.g. with a combination of length orienters and width orienters (tenters), or on an individual sheet-by-sheet basis using a batch uniaxial or biaxial stretcher.

The z-axis refractive index relationships discussed in '774 Jonza et al. can of course be used beneficially with the embodiments disclosed herein. Thus, the refractive indices of the constituent layers can be selected so that they produce interfaces for which the Brewster angle (the angle at which reflectance of p-polarized light goes to zero) is very large or is nonexistent by substantially matching the refractive indices in the thickness direction of adjacent layers. This allows for the construction of multilayer mirrors and polarizers whose reflectivity for p-polarized light decreases slowly with angle of incidence, are independent of angle of incidence, or increase with angle of incidence away from the normal. As a result, multilayer films having high reflectivity (for both s and p polarized light for any incident direction in the case of mirrors, and for the selected direction in the case of polarizers) over a wide bandwidth, can be achieved. For example, the refractive index difference of adjacent layers along the thickness or z-axis $\Delta n_z$ can be made zero or substantially zero, or small relative to an in-plane refractive index difference $\Delta n_x$, such as less than 0.5, 0.25, 0.1, or 0.05 times $\Delta n_x$. Furthermore, whether large or small, $\Delta n_z$ can be made to have an opposite polarity relative to an in-plane refractive index difference $\Delta n_x$.

For embodiments in which the thick film multilayer reflector is or comprises an oriented stack of polymer layers, the pre-stretch temperature, stretch temperature, stretch rate, stretch ratio, heat set temperature, heat set time, heat set relaxation, and cross-stretch relaxation can be selected to yield a multilayer device having suitable refractive index relationships. These variables are inter-dependent; thus, for example, a relatively low stretch rate may be used if coupled with, e.g., a relatively low stretch temperature. It will be apparent to one of ordinary skill how to select the appropriate combination of these variables to achieve the desired multilayer device.

Lamination of two or more sheets together in the manufacture of the disclosed thick film multilayer reflectors can be advantageous, such as to improve reflectivity or to form a mirror from two polarizers. In some cases, the number N of thick layers used in the reflector, and the average layer thickness and the layer material properties, may be such as to make the finished reflector rigid or stiff, and thus difficult to manufacture using only a single stretching operation. This is because the precursor or starting multilayer product which, after stretching, yields the finished thick film multilayer reflector, must have an overall thickness even greater than that of the finished reflector due to the consequence of thinning during stretching. In cases such as this, it may be advantageous to extrude and stretch single- or multiple layer polymer webs for example in a continuous roll process, and then employ a lamination process whether with multiple rolls continuously or with multiple individual sheets in a batch format. Lamination can be assisted with bonding means such as adhesive layers or tie layers between webs or sheets. In this way, single- or multiple layer polymer webs can be fabricated with conventional length orienters and/or tenters, and then be combined into a physically thick product such as a rigid plate that could not itself have been oriented on such equipment.

As mentioned above, uniaxial orientation of the multilayer construction can be done in a constrained or unconstrained fashion. For physically thick films, an unconstrained stretch can be advantageous in that the precursor or starting multilayer product need not be so thick as it would need to be if a constrained stretch were used. That is because the relaxation in the cross-stretch direction minimizes the amount of thinning that occurs for a given stretch ratio. The multilayer constructions can be stretched in the machine direction, as with a length orienter, or in the transverse (width) direction using a tenter. The multilayer constructions can be oriented simultaneously along two orthogonal directions, or sequentially, or both simultaneously and sequentially.

Figure 3:
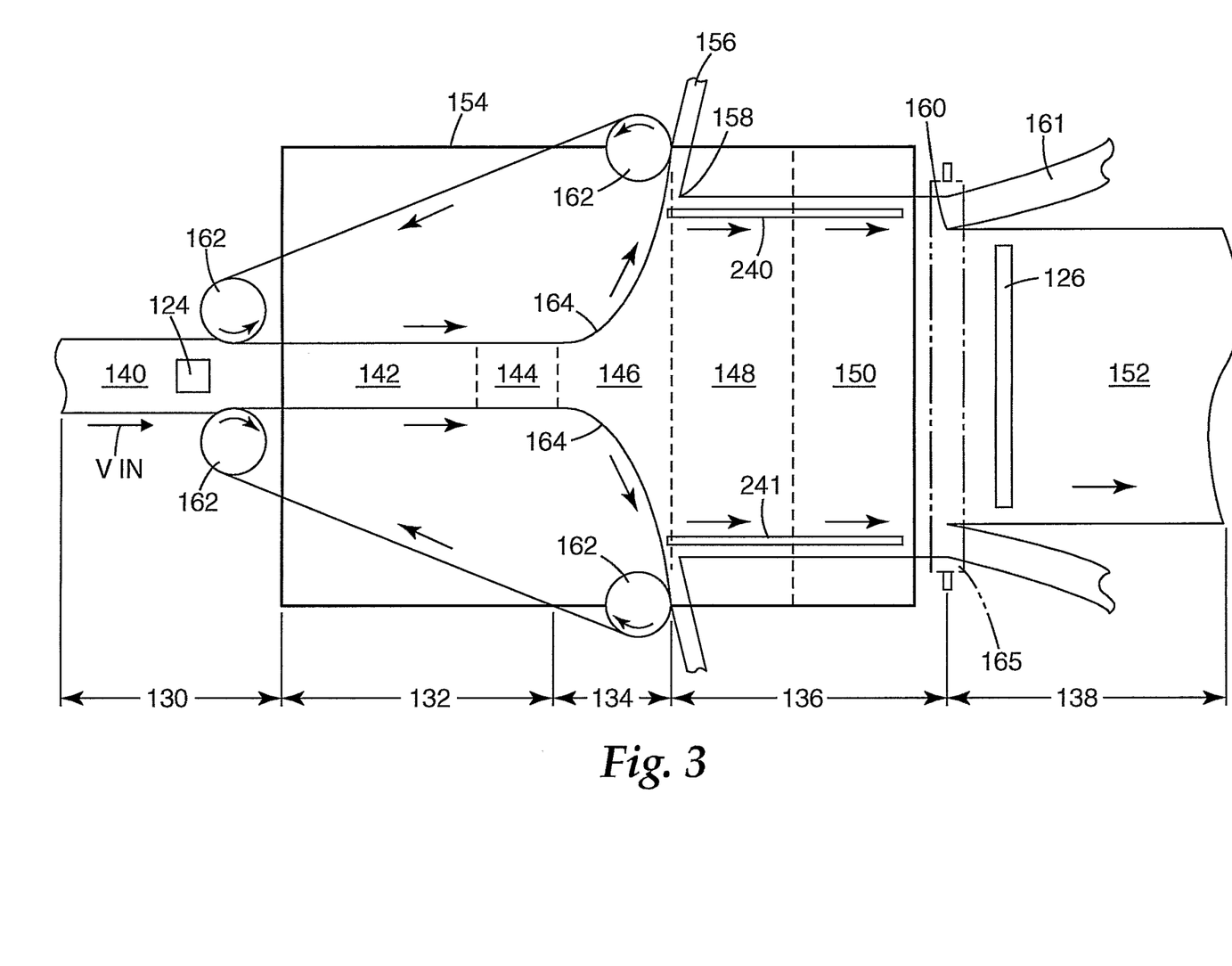
FIG. 3 is a diagram of a parabolic tenter apparatus suitable for uniaxially stretching a thick multilayer extrudate to form a thick film multilayer polarizer plate, or portions thereof.

FIG. 3 shows one embodiment of a stretching apparatus and method, which stretches a region of an optical body from an initial configuration 124 to a final, finished configuration 126. The optical body, which can be any thick film, thin film, or hybrid multilayer reflector or precursor thereof described herein (including a single layer film), can be provided to the stretching apparatus by any desirable method. In exemplary embodiments, the optical body can be stretched in a uniaxial manner that is precisely unconstrained, substantially unconstrained, or nearly unconstrained. Generally, an optical body 140 is presented in region 130 to one or more gripping members that are configured and arranged to hold opposing edges of the optical body and convey the optical body along opposing tracks 164 defining predetermined paths. The gripping members (not shown) typically hold the optical body at or near its edges. The portions of the optical body held by the gripping members are often unsuitable for use after stretching so the position of the gripping members is typically selected to provide sufficient grip on the film to permit stretching while controlling the amount of waste material generated by the process. The gripping members, such as clips, can be directed along the track by, for example, rollers 162 rotating a chain along the track with the gripping members coupled to the chain. The rollers are connected to a driver mechanism that controls the speed and direction of the film as it is conveyed through the stretching apparatus. Rollers can also be used to rotate and control the speed of belt-type gripping members.

In some embodiments, the optical body can be drawn in plane (i.e., the boundary trajectories and tracks are coplanar), but non-coplanar stretching trajectories can also be used. An ideal unconstrained uniaxial orientation or stretch can be achieved by configuring opposing tracks 164 to define a pair of mirror symmetric, coplanar, parabolic trajectories diverging away from the in-plane MD centerline.

The apparatus optionally includes a preconditioning region 132 that typically is enclosed by an oven 154 or other apparatus or arrangement to heat the optical body in preparation for stretching. The preconditioning region can include a preheating zone 142, a heat soak zone 144, or both. The optical body can be stretched in a primary stretching region 134. Typically, within the primary stretching region 134 the optical body is heated or maintained in a heated environment above the glass transition of the polymer(s) of the optical body. Within the primary stretching region 134, the gripping members follow generally diverging tracks to stretch the optical body by a desired amount. The tracks in the primary stretching region and in other regions of the apparatus can be formed using a variety of structures and materials. Outside of the primary stretching region, the tracks are typically substantially linear. The opposing linear tracks can be parallel or can be arranged to be converging or diverging. Within the primary stretching region, the tracks are generally diverging. In all regions of the stretching apparatus, the tracks can be formed using a series of linear or curvilinear segments that are optionally coupled together. As an alternative or in particular regions or groups of regions, the tracks can be formed as a single continuous construction. In at least some embodiments, the tracks in the primary stretching region are coupled to, but separable from, the tracks of the preceding regions. The tracks 240, 241 in the succeeding post-conditioning or removal regions are typically separated from the tracks of the primary stretching region, as illustrated. In some embodiments, the positions of one or more, and preferably all, of the track segments are adjustable (e.g., pivotable about an axis) so that the overall shape of the tracks can be adjusted if desired. Continuous tracks can also be used through each of the regions. Typically, the portions of the optical body that were held by the gripping members through the primary stretching region are removed.

To maintain a substantially uniaxial draw throughout substantially all of the draw history (as shown in the figure), at the end of the transverse stretch, the rapidly diverging edge portions 156 are preferably severed from the stretched optical body 148 at a slitting point 158. A cut can be made at 158 and flash or unusable portions 156 can be discarded. Release of the selvages from a continuous gripping mechanism can be done continuously; however, release from discrete gripping mechanisms, such as tenter clips, should preferably be done so that all the material under any given clip is released at once. This discrete release mechanism may cause larger upsets in stress that may be felt by the drawing web upstream. In order to assist the action of the isolating takeaway device, a continuous selvage separation mechanism can be used in the device, e.g. the "hot" slitting of the selvage from the central portion of a heated, drawn film. The slitting location can be located near enough to the "gripline", e.g. the isolating takeaway point of first effective contact by the gripping members of the take-away system, to minimize or reduce stress upsets upstream of that point. If the film is slit before the film is gripped by the take-away system, instable takeaway can result, for example, by film "snapback" along TD. The film is thus preferably slit at or downstream of the gripline. Slitting is a fracture process and, as such, typically has a small but natural variation in spatial location. Thus it may be desirable to slit slightly downstream of the gripline to prevent any temporal variations in slitting from occurring upstream of the gripline. If the film is slit substantially downstream from the gripline, the film between the takeaway and boundary trajectory will continue to stretch along TD. Since only this portion of the film is now drawing, it now draws at an amplified draw ratio relative to the boundary trajectory, creating further stress upsets that could propagate upstream, for example, undesirable levels of machine direction tension propagating upstream.

The slitting is preferably mobile and re-positionable so that it can vary with the changes in takeaway positions needed to accommodate variable final transverse draw direction ratio or adjustment of the position of the take-away system. An advantage of this type of slitting system is that the draw ratio can be adjusted while maintaining the draw profile simply by moving the take-away slitting point 158, preferably along the MD. A variety of slitting techniques can be used including a heat razor, a hot wire, a laser, a focused beam of intense IR radiation or a focused jet of heated air.

The apparatus may optionally include a post-conditioning region 136. For example, the optical body may be set (e.g., heat set) in zone 148 and quenched in zone 150. A takeaway system may be used to remove the optical body from the primary stretching region 134. In the illustrated embodiment, this takeaway system is independent of (i.e., isolated from or not directly connected to) the tracks upon which the film was conveyed through the primary stretching region. The takeaway system can use any film conveyance structures such as tracks 240, 241 with gripping members such as, for example, opposing sets of belts or tenter clips.

In some embodiments, TD shrinkage control can be accomplished using tracks 240, 241 that are angled with respect to each other. For example, the tracks of the take-away system can be positioned to follow a slowly converging path (making an angle of no more than about 5°) through at least a portion of the post conditioning region to allow for TD shrinkage of the film with cooling. In other embodiments, the two opposing tracks can be diverging typically at an angle of no more than about 3° although wider angles can be used in some embodiments. This can be useful to increase the MD tension of the film in the primary stretching region to, for example, reduce property non-uniformity such as the variation of principal axes of refractive index across the film.

In some embodiments, the centerline of the take-away system can be angled with respect to the centerline of the film as the film is conveyed through the tracks 164 of the primary stretching region. An angled take-away system, primary stretching zone, or both can be useful to provide films where the principal axis or axes of an property of the film, such as the refractive index axes or tear axis, is angled with respect to the film. In some embodiments, the angle that the take-away system makes with respect to the primary stretching zone is adjustable manually or mechanically using a computer-controlled driver or other control mechanism or both.

The process can also include a removal portion in region 138. Optionally a roller 165 may be used to advance the stretched film 152, but this component may be omitted if desired. Another cut 160 may be made and unused portion 161 may be discarded. Film leaving the take-away system is typically wound on rolls for later use. Alternatively, direct converting may take place after take away. Further details of the device and method can be found in U.S. Pat. Nos. 6,939,499 (Merrill et al.), 6,916,440 (Jackson et al.), 6,949,212 (Merrill et al.) and 6,936,209 (Jackson et al.).

With the above-described design considerations established, one of ordinary skill will readily appreciate that a wide variety of materials can be used to form the disclosed thick film multilayer reflectors when processed under conditions selected to yield the desired layer thickness profile and refractive index relationships.

For embodiments comprising coextruded polymers, it is known to divide the flow of two molten polymer streams into an alternating AB pattern using a feeder tube plate having a plurality of interleaved side channel tubes or conduits that each feed its own respective slot die. See, e.g., U.S. Pat. No. 6,827,886 (Neavin et al.). A gradient plate having two flow channels, one to feed a first polymer to half the conduits, the other to feed the other polymer to the remaining conduits, can be coupled to the feeder tube plate if desired. A desired layer thickness distribution, such as a randomized layer distribution, can be achieved, for example, by separately configuring the individual conduits in the feeder tube plate by, e.g., adjusting their diameter, length, and/or a local temperature. By so configuring the conduits, a greater or lesser amount of a particular polymer, as desired, can be fed into any particular conduit corresponding to any particular layer(s) of the finished multilayer reflector, thereby to make such layer(s) thicker or thinner.

The desired refractive index relationships can be achieved in a variety of ways, including stretching during or after film formation (e.g., in the case of organic polymers), extruding (e.g., in the case of liquid crystalline materials), or coating. In some cases it is desirable for the two materials to have similar rheological properties (e.g., melt viscosities) such that they can be co-extruded. Appropriate material combinations may comprise, as a first light-transmissive material, a crystalline or semi-crystalline material, preferably a polymer. A second light-transmissive material, in turn, may be crystalline, semi-crystalline, or amorphous. The second material may have a birefringence opposite to or the same as that of the first material. Or, the second material may have no birefringence. Indeed in some mirror constructions both the first and the second material may have no birefringence.

In cases where a first material is used that is optically birefringent and a second material is used that is optically isotropic, it may be desirable to adjust the distribution of layer thicknesses such that the layers comprising the first material are physically thinner than the layers comprising the second material. For example, the layers of the first material may have an average thickness less than the average thickness of the second material, or less than half of the average thickness of the second material. Such a construction may have beneficial anti-warp characteristics, since a majority of the overall thickness of the thick film multilayer reflector is made up of the isotropic material, which is more likely than the birefringent material to have isotropic thermal expansion characteristics.

An optical body such as a reflective polarizing film or polarizer plate can be tested or evaluated for its warp or anti-warp characteristics in a wide variety of ways. One straightforward way is to simply place the optical body in the intended application or device and monitor the appearance after a period of use. Temperature, humidity, and exposure to ultraviolet radiation, and other environmental factors can be adjusted or cycled to accelerate this process.

Without intending to be limiting, one exemplary method for evaluating warp in an optical body intended for use in the liquid crystal display of a conventional laptop computer will now be described. Start with two flat pieces of double strength glass, and clean them with isopropyl alcohol. The glass can be suitable sized, e.g., 9.5 by 12.5 inches (24.1 by 31.8 cm). Then attach a suitably sized piece of the optical body, e.g., 9 by 12 inches (22.9 by 30.5 cm), to one of the glass pieces along two short sides and one of the long sides, leaving the remaining long side of the optical body unconstrained. To attach the optical body, first attach non-overlapping strips of Double Stick Tape (3M, St. Paul, Minn.) to the piece of glass such that the tape strips are about a half-inch (1.3 cm) from three edges of the glass, forming a "U" shape, which will be completely covered by 3 sides of the optical body. Place the optical body on the tape such that the optical body is tensioned across the tape and is held above the glass surface by the thickness of the tape (about 0.1 mm). If the optical body is flexible, roll it down to the tape with a 4.5 lb. (2 kg) roller once in each direction, avoiding extra force.

Next, place three non-overlapping shims of the same length, width, and thickness as the tape strips onto the optical body in registration with the tape strips. The shims may, for example, be 0.1 mm thick, half-inch (1.3 cm) wide strips of polyethylene terephthalate (PET). The shims and the tape strips are thus disposed on opposite sides of the optical body. Next, place the other piece of glass on top of the shims and in registration with the bottom piece of glass. This completes a sandwiched construction of glass-tape-optical body-shim-glass, in which the optical body is constrained at three edges and substantially free floating in the center. This construction is held together with 4 binder clips as are commonly used to hold stacks of paper together (Binder Clips, Officemate International Corporation, Edison, N.J.). The clips should be appropriately sized to apply pressure to the center of the tape (approximately 0.75 inches or 1.9 cm from the edge of the glass) and are positioned two each on the short sides of the construction, each about 0.75" (1.9 cm) away from the bottom and top of the optical body.

This completed construction can then be placed in a suitable thermal shock chamber, such as Model SV4-2-2-15 Environmental Test Chamber, Envirotronics, Inc., Grand Rapids, Mich., and subjected to temperature cycling, e.g., 96 cycles, where each cycle consists of one hour at 85 degrees C. followed by one hour at −35 degrees C. Again, the maximum and minimum temperatures may depend on the intended application. The sandwiched construction can then be removed from the chamber, and the optical body inspected for wrinkles. In some cases, depending on the requirements of the particular end-use application, the amount of warp may be considered unacceptable if many deep wrinkles have formed across the surface of the optical body, and acceptable if no wrinkles or only a few shallow wrinkles have formed.

For polarizing reflectors, it is advantageous for the difference in the index of refraction of the first and second light-transmissive materials in one in-plane direction to differ significantly in the finished polarizer, while the difference in the orthogonal in-plane index is minimized. If a first polymer has a large refractive index when isotropic, and is positively birefringent (that is, its refractive index increases in the direction of stretching), a second polymer will typically be chosen to have a matching refractive index, after processing, in the planar direction orthogonal to the stretching direction, and a refractive index in the direction of stretching which is as low as possible. Conversely, if the first polymer has a small refractive index when isotropic, and is negatively birefringent, the second polymer will typically be chosen to have a matching refractive index, after processing, in the planar direction orthogonal to the stretching direction, and a refractive index in the direction of stretching which is as high as possible. Alternatively, it is possible to select a first polymer that is positively birefringent and has an intermediate or low refractive index when isotropic, or one that is negatively birefringent and has an intermediate or high refractive index when isotropic. In these cases, the second polymer may typically be chosen so that, after processing, its refractive index matches that of the first polymer in either the stretching direction or the planar direction orthogonal to stretching. Further, the second polymer can be chosen such that the difference in index of refraction in the remaining in-plane direction is maximized, regardless of whether this is best accomplished by a very low or very high index of refraction in that direction.

Absorbance is another consideration. For most applications, it is advantageous for neither the first nor the second light-transmissive material to have any absorbance bands within the bandwidth of interest for the reflector in question. Thus, all incident light within the bandwidth is either reflected or transmitted. However, for some applications, it may be useful for one or both of the first and second polymer to absorb specific wavelengths, either totally or in part.

Although many polymers may be chosen as the first polymer, certain of the polyesters have the capability for particularly large birefringence. Among these, polyethylene 2,6-naphthalate (PEN) can be chosen as a first polymer for the disclosed reflectors. It has a very large positive stress optical coefficient, retains birefringence effectively after stretching, and has little or no absorbance within the visible range. It also has a large index of refraction in the isotropic state. Its refractive index for polarized incident light of 550 nm wavelength increases when the plane of polarization is parallel to the stretch direction from about 1.64 to as high as about 1.9. Its birefringence can be increased by increasing its molecular orientation which, in turn, may be increased by stretching to greater stretch ratios with other stretching conditions held fixed.

Other semicrystalline naphthalene dicarboxylic polyesters are also suitable as first polymers. Polybutylene 2,6-Naphthalate (PBN) is an example. These polymers may be homopolymers or copolymers, provided that the use of comonomers does not substantially impair the stress optical coefficient or retention of birefringence after stretching. In practice, this restriction imposes an upper limit on the comonomer content, the exact value of which will vary with the choice of comonomer(s) employed. Some compromise in these properties may be accepted, however, if comonomer incorporation results in improvement of other properties. Such properties include but are not limited to improved interlayer adhesion, lower melting point (resulting in lower extrusion temperature), better rheological matching to other polymers in the film, and advantageous shifts in the process window for stretching due to change in the glass transition temperature.

Suitable comonomers for use in PEN, PBN or the like may be of the diol or dicarboxylic acid or ester type. Dicarboxylic acid comonomers include but are not limited to terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6-decahydronaphthalene dicarboxylic acid and its isomers, bi- or multi-cyclic dicarboxylic acids (such as the various isomeric norbornene and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneantlirene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chain-ester diols such as 3-hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bi- or multicyclic diols (such as the various isomeric tricyclodecane dimethanols, norbornane dimethanols, norbornene dimethanols, and bicyclo-octane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4'-dihydroxymethyl biphenyl and its isomers, and 1,3-bis(2-hydroxyethoxy)benzene and its isomers), and lower alkyl ethers or diethers of these diols, such as dimethyl or diethyl diols.

Tri- or polyfunctional comonomers, which can serve to impart a branched structure to the polyester molecules, can also be used. They may be of either the carboxylic acid, ester, hydroxy or ether types. Examples include, but are not limited to, trimellitic acid and its esters, trimethylol propane, and pentaerythritol.

Also suitable as comonomers are monomers of mixed functionality, including hydroxycarboxylic acids such as parahydroxybenzoic acid and 6-hydroxy-2-naphthalenecarboxylic acid, and their isomers, and tri- or polyfunctional comonomers of mixed functionality such as 5-hydroxyisophthalic acid and the like.

Polyethylene terephthalate (PET) is another material that exhibits a significant positive stress optical coefficient, retains birefringence effectively after stretching, and has little or no absorbance within the visible range. Thus, it and its high PET-content copolymers employing comonomers listed above may also be used as first polymers in some applications.

When a naphthalene dicarboxylic polyester such as PEN or PBN is chosen as first polymer, there are several approaches which may be taken to the selection of a second polymer. An approach for some applications is to select a naphthalene dicarboxylic copolyester (coPEN) formulated so as to develop significantly less or no birefringence when stretched. This can be accomplished by choosing comonomers and their concentrations in the copolymer such that crystallizability of the coPEN is eliminated or greatly reduced. One typical formulation employs as the dicarboxylic acid or ester components dimethyl naphthalate at from about 20 mole percent to about 80 mole percent and dimethyl terephthalate or dimethyl isophthalate at from about 20 mole percent to about 80 mole percent, and employs ethylene glycol as diol component. Of course, the corresponding dicarboxylic acids maybe used instead of the esters. The number of comonomers which can be employed in the formulation of a coPEN second polymer is not limited. Suitable comonomers for a coPEN second polymer include but are not limited to all of the comonomers listed above as suitable PEN comonomers, including the acid, ester, hydroxy, ether, tri- or polyfunctional, and mixed functionality types.

Polycarbonates having a glass transition temperature compatible with that of PEN and having a refractive index similar to the isotropic refractive index of PEN can also be useful as second polymers. Polyesters, copolyesters, polycarbonates, and copolycarbonates may also be fed together to an extruder and transesterified into new suitable copolymeric second polymers.

It is not required that the second polymer be a copolyester or copolycarbonate. Vinyl polymers and copolymers made from monomers such as vinyl naphthalenes, styrenes, ethylene, maleic anhydride, acrylates, acetates, and methacrylates may be employed. Condensation polymers other than polyesters and polycarbonates may also be used. Examples include: polysulfones, polyamides, polyurethanes, polyamic acids, and polyimides. Naphthalene groups and halogens such as chlorine, bromine and iodine are useful for increasing the refractive index of the second polymer to a desired level. Acrylate groups and fluorine are particularly useful in decreasing refractive index when this is desired.

It will be understood from the foregoing discussion that the choice of a second polymer is dependent not only on the intended application of the multilayer optical film in question, but also on the choice made for the first polymer, and the processing conditions employed in stretching. Suitable second polymer materials include but are not limited to polyethylene naphthalate (PEN) and isomers thereof (such as 2,6-, 1,4-, 1,5-, 2,7-, and 2,3-PEN), polyalkylene terephthalates (such as polyethylene terephthalate, polybutylene terephthalate, and poly-1,4-cyclohexanedimethylene terephthalate), other polyesters, polycarbonates, polyarylates, polyamides (such as nylon 6, nylon 11, nylon 12, nylon 4/6, nylon 6/6, nylon 6/9, nylon 6/10, nylon 6/12, and nylon 6/T), polyimides (including thermoplastic polyimides and polyacrylic imides), polyamide-imides, polyether-amides, polyetherimides, polyaryl ethers (such as polyphenylene ether and the ring-substituted polyphenylene oxides), polyarylether ketones such as polyetheretherketone ("PEEK"), aliphatic polyketones (such as copolymers and terpolymers of ethylene and/or propylene with carbon dioxide), polyphenylene sulfide, polysulfones (including polyethersulfones and polyaryl sulfones), atactic polystyrene, syndiotactic polystyrene ("sPS") and its derivatives (such as syndiotactic poly-alpha-methyl styrene and syndiotactic polydichlorostyrene), blends of any of these polystyrenes (with each other or with other polymers, such as polyphenylene oxides), copolymers of any of these polystyrenes (such as styrene-butadiene copolymers, styrene-acrylonitrile copolymers, and acrylonitrile-butadiene-styrene terpolymers), polyacrylates (such as polymethyl acrylate, polyethyl acrylate, and polybutyl acrylate), polymethacrylates (such as polymethyl methacrylate, polyethyl methacrylate, polypropyl methacrylate, and polyisobutyl methacrylate), cellulose derivatives (such as ethyl cellulose, cellulose acetate, cellulose propionate, cellulose acetate butyrate, and cellulose nitrate), polyalkylene polymers (such as polyethylene, polypropylene, polybutylene, polyisobutylene, and poly (4-methyl)pentene), fluorinated polymers and copolymers (such as polytetrafluoroethylene, polytrifluoroethylene, polyvinylidene fluoride, polyvinyl fluoride, fluorinated ethylenepropylene copolymers, perfluoroalkoxy resins, polychlorotrifluoro ethylene, polyethylene-co-tri fluoro ethylene, polyethylene-co-chlorotrifluoroethylene), chlorinated polymers (such as polyvinylidene chloride and polyvinyl chloride), polyacrylonitrile, polyvinylacetate, polyethers (such as polyoxymethylene and polyethylene oxide), ionomeric resins, elastomers (such as polybutadiene, polyisoprene, and neoprene), silicone resins, epoxy resins, and polyurethanes.

Also suitable are copolymers, such as the copolymers of PEN discussed above as well as any other non-naphthalene group-containing copolyesters which may be formulated from the above lists of suitable polyester comonomers for PEN. In some applications, especially when PET serves as the first polymer, copolyesters based on PET and comonomers from said lists above (coPETs) are especially suitable. In addition, either first or second polymers may consist of miscible or immiscible blends of two or more of the above-described polymers or copolymers (such as blends of sPS and atactic polystyrene, or of PEN and sPS). The coPENs and coPETs described may be synthesized directly, or may be formulated as a blend of pellets where at least one component is a polymer based on naphthalene dicarboxylic acid or terephthalic acid and other components are polycarbonates or other polyesters, such as a PET, a PEN, a coPET, or a co-PEN.

Another family of materials for the second polymer for some applications are the syndiotactic vinyl aromatic polymers, such as syndiotactic polystyrene. Syndiotactic vinyl aromatic polymers useful in the current invention include poly(styrene), poly(alkyl styrene)s, poly(aryl styrene)s, poly (styrene halide)s, poly(alkoxy styrene)s, poly(vinyl ester benzoate), poly(vinyl naphthalene), poly(vinylstyrene), and poly(acenaphthalene), as well as the hydrogenated polymers and mixtures or copolymers containing these structural units. Examples of poly(alkyl styrene)s include the isomers of the following: poly(methyl styrene), poly(ethyl styrene), poly (propyl styrene), and poly(butyl styrene). Examples of poly (aryl styrene)s include the isomers of poly(phenyl styrene). As for the poly(styrene halide)s, examples include the isomers of the following: poly(chlorostyrene), poly(bromostyrene), and poly(fluorostyrene). Examples of poly(alkoxy styrene)s include the isomers of the following: poly(methoxy styrene) and poly(ethoxy styrene). Among these examples, particularly preferable styrene group polymers, are: polystyrene, poly(p-methyl styrene), poly(m-methyl styrene), poly (p-tertiary butyl styrene), poly(p-chlorostyrene), poly(m-chloro styrene), poly(p-fluoro styrene), and copolymers of styrene and p-methyl styrene.

Furthermore, comonomers may be used to make syndiotactic vinyl aromatic group copolymers. In addition to the monomers for the homopolymers listed above in defining the syndiotactic vinyl aromatic polymers group, suitable comonomers include olefin monomers (such as ethylene, propylene, butenes, pentenes, hexenes, octenes or decenes), diene monomers (such as butadiene and isoprene), and polar vinyl monomers (such as cyclic diene monomers, methyl methacrylate, maleic acid anhydride, or acrylonitrile).

When a polarizer is made using a process with predominantly uniaxial stretching, suitable combinations of polymers for optical layers include PEN/coPEN, PET/coPET, PEN/sPS, PET/sPS, PEN/Eastar™, and PET/Eastar™, where "coPEN" refers to a copolymer or blend based upon naphthalene dicarboxylic acid (as described above) and Eastar™ is a polyester or copolyester (believed to comprise cyclohexanedimethylene diol units and terephthalate units) commercially available from Eastman Chemical Company. When a polarizer is to be made by manipulating the process conditions of a biaxial stretching process, suitable combinations of polymers for individual layers include PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol.

For some reflectors, a match of the refractive indices of the first and second light-transmissive materials in the thickness or z-direction is sometimes preferred, because it provides for constant reflectance with respect to the angle of incident light (that is, there is no Brewster's angle). For example, at a specific wavelength, the in-plane refractive indices may be 1.76 for biaxially oriented PEN, while the film plane-normal refractive index may fall to 1.49. When PMMA is used as the second polymer, its refractive index at the same wavelength, in all three directions, might be 1.495. Another example is the PET/Ecdel™ system, in which the analogous indices might be 1.66 and 1.51 for PET, while the isotropic index of Ecdel™ might be 1.52. Ecdel™ is a thermoplastic polyester or copolyester (believed to comprise cyclohexanedicarboxylate units, polytetramethylene ether glycol units, and cyclohexanedimethanol units) commercially available from Eastman Chemical Co. The relevant property is that the normal-to-plane index for one material is closer to the in-plane indices of the other material than to its own in-plane indices.

In other embodiments, a deliberate mismatching of the normal-to-plane refractive index is desirable. Some examples include those involving two or three or more polymeric layers in the optical stack in which a deliberate mismatch in the normal-to-plane index is opposite in sign to the index mismatch in one of the in-plane directions. In some cases it is desirable for the multilayer reflectors to consist of more than two distinguishable polymers or other light-transmissive materials. A third or subsequent polymer, for example, might be fruitfully employed as an adhesion-promoting layer between the first polymer and the second polymer within a layered stack, as an additional component in a stack for optical purposes, as a protective boundary layer, as a skin layer, as a functional coating, or for any other purpose. As such, the composition of a third or subsequent polymer, if any, is not limited. Some suitable multicomponent constructions are described in U.S. Pat. No. 6,207,260 (Wheatley et al.).

Unless otherwise indicated, all numbers expressing feature sizes, amounts, and physical properties used in the specification and claims are to be understood as being modified by the term "about." Accordingly, unless indicated to the contrary, the numerical parameters set forth in the present specification and claims are approximations that can vary depending upon the desired properties sought to be obtained by those skilled in the art utilizing the teachings disclosed herein.

Various modifications and alterations of this invention will be apparent to those skilled in the art without departing from the scope and spirit of this invention, and it should be understood that this invention is not limited to the illustrative embodiments set forth herein. All U.S. patents, patent applications, and other patent and non-patent documents referred to herein are incorporated by reference, to the extent they are not inconsistent with the foregoing disclosure.

What is claimed is:

1. A multilayer reflective polarizer plate that substantially reflects at least normally incident light of a block polarization state over the visible spectrum, comprising:
   a stack of light transmissive polymer layers comprising at least a first and second alternating polymer material, the polymer layers contributing substantially to the reflectivity of the reflective polarizer, the first and second materials having refractive indices along orthogonal in-plane axes that define a pass axis and a block axis for the polarizer plate;
   wherein the polymer layers of the stack have an average optical thickness of at least about $(5/4)\lambda_0$, where $\lambda_0$ is a visible wavelength of interest;
   wherein the polarizer plate is adapted for use in a liquid crystal display device;
   wherein the polymer layers of the stack are sufficiently thick to provide the polarizer plate with a mechanical stiffness adequate to prevent sagging, warping, or buckling over a viewable area of the display when the polarizer plate is edge-mounted in the display; and
   wherein the polarizer plate also scatters light, the polarizer plate being adapted to scatter reflected light of the block polarization state more or less than transmitted light of a pass polarization state orthogonal to the block polarization state.

2. The polarizer plate of claim 1, wherein the polarizer plate is adapted to scatter reflected light of the block polarization state more than transmitted light of the pass polarization state.

3. The polarizer plate of claim 1, wherein the polarizer plate is adapted to scatter reflected light of the block polarization state less than transmitted light of the pass polarization state.

4. The polarizer plate of claim 2, where the polarizer plate includes one or more roughened interior surfaces.

5. The polarizer plate of claim 2, wherein the polarizer plate includes particles disposed in at least one of the polymer layers, the particles being adapted to scatter reflected light of the block polarization state more than transmitted light of the pass polarization state.

6. The polarizer plate of claim 3, wherein the polarizer plate includes particles disposed in at least one of the polymer layers, the particles being adapted to scatter reflected light of the block polarization state less than transmitted light of the pass polarization state.

7. The polarizer plate of claim 1, wherein the stack of polymer layers is oriented by an unconstrained uniaxial stretch process.

8. The polarizer plate of claim 1, wherein the polarizer plate has an overall thickness in a range from 1 to 10 mm.

9. The polarizer plate of claim 1, wherein $\lambda_0$ is 550 nm.

10. The polarizer plate of claim 1, wherein $\lambda_0$ is 700 nm.

11. The polarizer plate of claim 1, wherein most of the polymer layers of the stack have thicknesses greater than $(5/4)\lambda_0$.

12. The polarizer plate of claim 11, wherein most of the polymer layers of the stack have thicknesses greater than $2\lambda_0$.

13. The polarizer plate of claim 12, wherein most of the polymer layers of the stack have thicknesses greater than $5\lambda_0$.

14. The polarizer plate of claim 13, wherein most of the polymer layers of the stack have thicknesses greater than $10\lambda_0$.

15. A system, comprising:
a liquid crystal display device; and
the polarizer plate of claim 1 mounted in the liquid crystal display device.

16. A multilayer reflective polarizer plate that substantially reflects at least normally incident light of a block polarization state over the visible spectrum, comprising:

a stack of light transmissive polymer layers comprising at least a first and second alternating polymer material, the polymer layers contributing substantially to the reflectivity of the reflective polarizer, the first and second materials having refractive indices along orthogonal in-plane axes that define a pass axis and a block axis for the polarizer plate;

wherein the polymer layers of the stack have an average optical thickness of at least $2\lambda_0$, where $\lambda_0$ is a visible wavelength of interest;

wherein the polarizer plate is adapted for use in a liquid crystal display device; and wherein the polymer layers of the stack are sufficiently thick to provide the polarizer plate with a mechanical stiffness adequate to prevent sagging, warping, or buckling over a viewable area of the display when the polarizer plate is edge-mounted in the display.

17. The polarizer plate of claim 16, wherein $\lambda_0$ is 550 nm.

18. The polarizer plate of claim 16, wherein $\lambda_0$ is 700 nm.

19. The polarizer plate of claim 16, wherein most of the polymer layers of the stack have thicknesses greater than $5\lambda_0$.

20. The polarizer plate of claim 16, wherein most of the polymer layers of the stack have thicknesses greater than $10\lambda_0$.

21. The polarizer plate of claim 16, wherein substantially all of the polymer layers of the stack have thicknesses greater than $2\lambda_0$.

22. The polarizer plate of claim 16, wherein substantially all of the polymer layers of the stack have thicknesses greater than $5\lambda_0$.

23. The polarizer plate of claim 16, wherein substantially all of the polymer layers of the stack have thicknesses greater than $10\lambda_0$.

* * * * *

UNITED STATES PATENT AND TRADEMARK OFFICE
CERTIFICATE OF CORRECTION

| | | |
|---|---|---|
| PATENT NO. | : 8,035,774 B2 | Page 1 of 1 |
| APPLICATION NO. | : 11/911448 | |
| DATED | : October 11, 2011 | |
| INVENTOR(S) | : Andrew John Ouderkirk | |

It is certified that error appears in the above-identified patent and that said Letters Patent is hereby corrected as shown below:

IN THE SPECIFICATIONS:

Column 4,
Line 42, Delete "polarization converting" and insert
-- polarization-converting --, therefor.

Column 16,
Line 53, Delete "pheneantlirene," and insert -- phenanthrene, --, therefor.

Column 18,
Line 41, Delete "ethylenepropylene" and insert -- ethylene-propylene --, therefor.

Signed and Sealed this
Twenty-seventh Day of December, 2011

David J. Kappos
*Director of the United States Patent and Trademark Office*